US008306111B2

(12) United States Patent
Yang et al.

(10) Patent No.: US 8,306,111 B2
(45) Date of Patent: Nov. 6, 2012

(54) IMAGE ANALYSIS USING A HYBRID CONNECTED COMPONENT LABELING PROCESS

(75) Inventors: Sheng-Yan Yang, Chung-Ho (TW); Chih-Hao Chang, Chung-Ho (TW)

(73) Assignee: Vatics, Inc., Chung-Ho (TW)

( * ) Notice: Subject to any disclaimer, the term of this patent is extended or adjusted under 35 U.S.C. 154(b) by 596 days.

(21) Appl. No.: 12/456,226

(22) Filed: Jun. 11, 2009

(65) Prior Publication Data

US 2009/0309979 A1    Dec. 17, 2009

(30) Foreign Application Priority Data

Jun. 11, 2008 (TW) .............................. 97121627 A

(51) Int. Cl.
*H04N 11/02* (2006.01)
*H04N 7/18* (2006.01)
(52) U.S. Cl. .................... 375/240.08; 348/143
(58) Field of Classification Search .............. 348/143
See application file for complete search history.

(56) References Cited

U.S. PATENT DOCUMENTS

| 5,048,096 | A | | 9/1991 | Beato |
| 5,841,903 | A | | 11/1998 | Kikuchi |
| 5,889,885 | A | * | 3/1999 | Moed et al. .................. 382/172 |
| 6,810,079 | B2 | * | 10/2004 | Itokawa ..................... 375/240.08 |
| 7,608,844 | B2 | * | 10/2009 | Inoue et al. ................. 250/492.22 |
| 2006/0285743 | A1 | * | 12/2006 | Oh et al. ..................... 382/170 |
| 2009/0219379 | A1 | * | 9/2009 | Rossato et al. .............. 348/14.01 |

OTHER PUBLICATIONS

Suzuki et al., "Linear-Time Connected-Component Labeling Based on Sequential Local Operations", Computer Vision & Image Understanding, vol. 89, No. 1, (2003), pp. 1-23.
Wu et al., "Two Strategies to Speed Up Connected Component Labeling Algorithms", Lawrence Berkeley National Laboratory Tech Report LBNL-59102, (2005), pp. 1-23.
Chang et al., "A Linear-Time Component-Labeling Algorithm Using Contour Tracing Technique", Computer Vision & Image Understanding, vol. 93, No. 2, (2004), pp. 206-220.

* cited by examiner

*Primary Examiner* — Nhon Diep
*Assistant Examiner* — Leron Beck
(74) *Attorney, Agent, or Firm* — Liu & Liu

(57) ABSTRACT

A hybrid connected component labeling process for analyzing digitized or binary images includes the following steps. Firstly, a forward scan is executed to assign a forward label to each foreground pixel in the image. Then, a backward scan is executed to assign a backward label to each foreground. The backward labels are rearranged and label connection is recorded. A label allocation table including final labels and reference labels is provided for recording the use of the labels. When an object is considered as noise, the label corresponds to the pixels of the object is released by updating the label allocation table.

19 Claims, 18 Drawing Sheets

600

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 1  |   |   |   |   |   | 0 |   |   | 1 |    |    | 2  |    |    | 3  |    |    |    |    |    |
| 2  |   |   |   |   |   | 0 |   |   | 1 |    |    | 2  |    |    | 3  |    |    |    |    |    |
| 3  |   |   |   |   |   | 0 | 0 | 0 | 0 |    |    | 2  | 2  | 2  | 2  |    |    |    |    |    |
| 4  |   |   |   |   |   |   |   |   | 0 |    |    | 2  |    |    |    |    |    |    |    |    |
| 5  |   |   |   |   |   |   |   |   | 0 | 0  | 0  | 0  |    |    |    |    |    |    |    |    |
| 6  |   |   |   |   |   |   |   |   |   |    |    |    |    |    |    |    |    |    |    |    |
| 7  |   |   |   |   |   |   |   |   |   |    |    |    |    |    |    |    |    |    |    |    |
| 8  |   |   |   |   |   |   |   |   |   |    |    |    |    |    |    |    |    |    |    |    |
| 9  |   |   |   |   |   |   | 4 |   | 5 |    |    |    |    |    |    |    |    |    |    |    |
| 10 |   |   |   |   |   |   |   | 4 |   |    |    |    |    |    |    |    |    |    |    |    |
| 11 |   |   |   |   |   |   |   |   |   |    |    |    |    | 6  |    |    |    |    |    |    |
| 12 |   |   |   |   |   |   |   |   |   |    |    |    |    |    |    |    |    |    |    |    |
| 13 |   |   |   |   |   |   |   |   |   |    |    |    |    |    |    |    |    |    |    |    |
| 14 |   |   |   |   |   |   |   |   |   |    |    |    |    |    |    |    |    |    |    |    |
| 15 |   |   |   |   |   |   |   |   |   |    |    |    |    |    |    |    |    |    |    |    |
| 16 |   |   |   |   |   |   |   |   |   |    |    |    |    |    |    |    |    |    |    |    |

FIG.6B

IMAGE ANALYSIS USING A HYBRID CONNECTED COMPONENT LABELING PROCESS

FIELD OF THE INVENTION

The present invention relates to a connected component labeling process for analyzing digitized or binary images, and more particularly to a connected component labeling process combining features of multi-pass algorithm and two-pass algorithm.

BACKGROUND OF THE INVENTION

For safety purpose, intelligent video surveillance system is developed rapidly in recent years. There have been many surveillance systems applied to our surrounding environments, such as airports, train stations, shopping malls, and even private residential areas where tight or great security is required. Among those, the intelligent video surveillance systems are roughly classified into two levels. Low-level intelligent video surveillance system can detect features of objects in the image frames. The data obtained by the low-level intelligent video surveillance system can be further processed by high-level intelligent video surveillance system to monitor various events in real time, e.g. motion detection.

One typical approach for motion detection is background subtraction. Background subtraction refers to a robust background model. A binary mask obtained by an adaptive background subtraction specifies whether a pixel belongs to the background or foreground. The foreground pixels are analyzed to get connected components. Connected component labeling algorithm is advantageous to estimate the total number of the objects in the binary mask by means of grouping connected pixels and assigning a unique label for connected pixels.

A basic forward scan procedure in the connected component labeling algorithm is described with reference to FIG. 1. The binary mask 100 is scanned from left to right and top to bottom as denoted by the arrow 101. That is, the pixels are scanned in the order from a to i. During the forward scan procedure, each foreground pixel is assigned a label. For example, when the forward scan procedure reaches pixel e, the previous pixels a~d (called as "reference neighbor pixels" hereinafter) have been scanned and assigned a corresponding label. The smallest one of the labels assigned to the L-shape reference neighbor pixels (and the label assigned to the current pixel in a previous scan procedure, if any) is assigned to the current pixel e. If none of the reference neighbor pixels is foreground pixel and the current pixel receives no label, a new label is assigned to the current pixel e. By repeating the step, each foreground pixel receives a label after the forward scan procedure.

The forward scan procedure is applied to several connected component labeling algorithm, e.g. multi-pass algorithm and two-pass algorithm. In the multi-pass algorithm, the forward scan procedure and a backward scan procedure are alternatively performed until there are no changes in labels. Backward scan procedure scans in a reverse direction to the forward scan procedure, i.e. from right to left and bottom to top. Therefore, the reference neighbor pixels of current pixel e are pixels f~i. The drawback of multi-pass algorithm is terribly large number of passes. Someone proposes using a label connection table to reduce the number of scans. However, the iteration still consumes great amount of resources due to continuous reading the label information of the whole image. Furthermore, the number of assigned labels cannot be reduced effectively during the scan procedures.

Two-pass algorithm generally operates in three phases. At first, in the scanning phase, the image is scanned once to assign provisional labels to all foreground pixels, and the label equivalence information about the provisional labels is recorded. Then, in an analysis phase, the label equivalence information is analyzed to determine the final label of each foreground pixel. At last, in a labeling phase, the final labels are assigned in a second pass (scan) through the image. In practice, the analysis phase may be integrated into the other two. Although the two-pass algorithm required only two scans, too many assigned labels together with the label connection table recording the relations of assigned labels occupy memory and exhaust the label supply of hardware, especially when too much noise is included.

Therefore, there is a need of providing an efficient connected component labeling algorithm requiring less hardware resource to obviate the drawbacks encountered from the prior art.

SUMMARY OF THE INVENTION

The present invention provides a hybrid connected component labeling process combining the advantages of multi-pass algorithm and two-pass algorithm for analyzing a digitized or binary image. The process uses fewer labels and saves hardware resource to increase the efficiency of hardware implementation.

In an embodiment, the hybrid connected component labeling process mainly includes three procedures: forward scan procedure, backward scan procedure and label rearrange procedure. The forward scan procedure includes steps of: scanning pixels of the image to be analyzed in a forward direction; and assigning a forward label to the scanned pixel according to the forward label of reference neighbor pixels when the scanned pixel is a foreground pixel. The backward scan procedure includes steps of: scanning pixels of the image in a backward direction; and assigning a backward label to the scanned pixel according to the backward label of reference neighbor pixels and the forward label of the scanned pixel when the scanned pixel is a foreground pixel. The label rearrange procedure includes steps of: providing a label allocation table including final labels and corresponding reference labels; scanning the pixels in the forward direction again; assigning one final label to the scanned pixel according to the backward label of the scanned pixel and the reference labels; recording label connection when the final label of the scanned pixel is different from that of any reference neighbor pixel; and updating the reference label in the label allocation table according to the label connection to release the final label corresponding to the reference label.

A method for analyzing an image frame using the hybrid connected component labeling process is also provided. The method includes steps of: establishing a background model; subtracting the background model from the frame to obtain a binary mask; and executing the forward scan procedure, the backward scan procedure and the label rearrange procedure of the hybrid connected component labeling process for the binary mask.

A method of releasing a noise-related label is further provided. At first, a row of pixels of the image are scanned. Then, an area of an object, consisting of pixels scanned before the row of pixels, is calculated. If the area is smaller than a predetermined threshold area, the final label corresponding to the pixels of the object is released. Thus, the final label is released during the scan of the image rather than after the scan.

BRIEF DESCRIPTION OF THE DRAWINGS

The above contents of the present invention will become more readily apparent to those ordinarily skilled in the art after reviewing the following detailed description and accompanying drawings, in which:

FIGS. 6A~6I schematically illustrate how the hybrid connected component labeling algorithm of the present invention operates with label allocation table;

DETAILED DESCRIPTION OF THE PREFERRED EMBODIMENT

Figure 1:
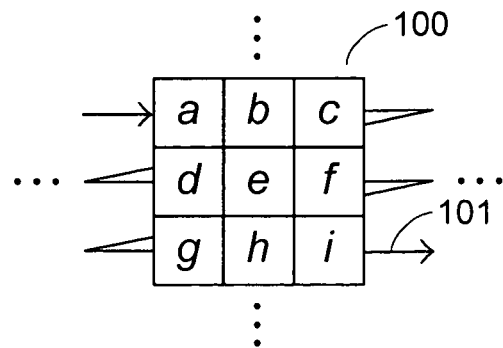
FIG. 1 schematically illustrates a binary mask in a basic forward scan procedure of a connected component labeling algorithm.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The process and system of the present invention has been described below in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

The detailed descriptions of the process of the present invention are presented below largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated.

Useful devices for performing the software implemented operations of the present invention include, but are not limited to, general or specific purpose digital processing and/or computing devices, which devices may be standalone devices or part of a larger system. Different types of client devices may be implemented with the information extraction application of the present invention. For example, the image analyzing application of the present invention may be applied to desktop computing device, portable computing device, or hand-held devices (e.g., cell phones, PDAs (personal digital assistants), etc.) The devices may be selectively activated or reconfigured by a program, routine and/or a sequence of instructions and/or logic stored in the devices, to accomplish the features and functions of image detection and decoding of the present invention described herein. In short, use of the methods described and suggested herein is not limited to a particular processing configuration.

The present invention provides a connected component labeling process for analyzing a digitized image by combining the advantages of multi-pass algorithm and two-pass algorithm. For purposes of illustrating the principles of the present invention and not by limitation, the present invention is described herein below by reference to a software implementation of the concept of the present invention in the form of a hybrid connected component labeling algorithm. The hybrid connected component labeling algorithm implements the various steps described hereinbelow.

Figure 2:
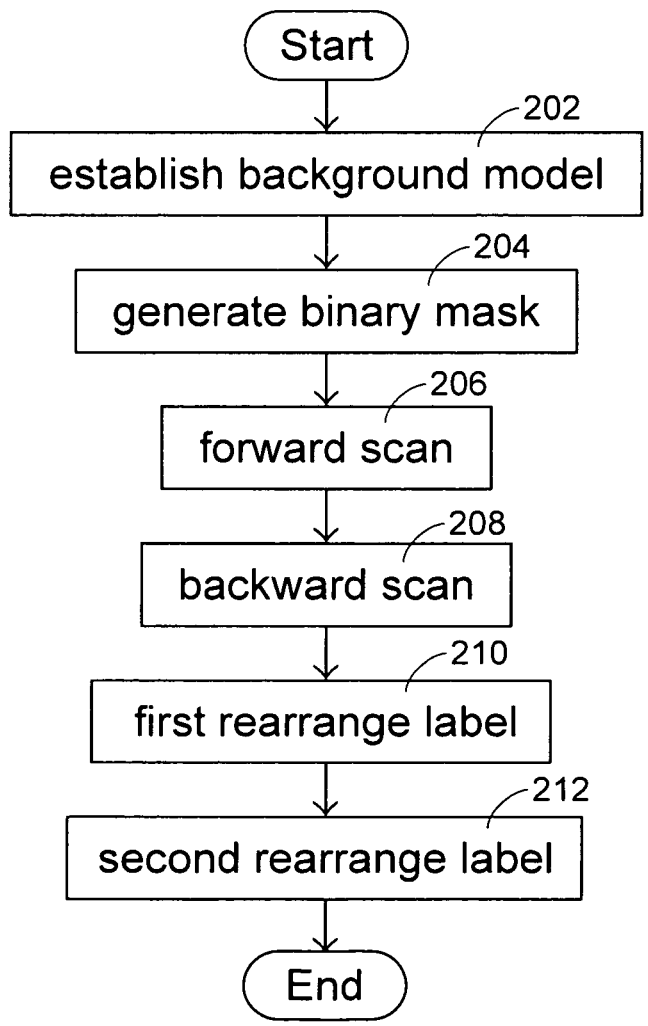
FIG. 2 is a flowchart illustrating an image analysis method using a hybrid connected component labeling algorithm according to a preferred embodiment of the present invention.

Please refer to FIG. 2, a flowchart illustrating an image analysis method using the hybrid connected component labeling algorithm according to a preferred embodiment of the present invention. In step 202, a background model is established as a standard to be compared with the following image frames. Then, in step 204, a binary mask is obtained by comparing the current image frame and the background model. In one embodiment, background subtraction is proposed, but other known approach is also applicable. In this step, foreground objects to be processed by the hybrid connected component labeling algorithm are extracted from the image frame.

Figure 3:
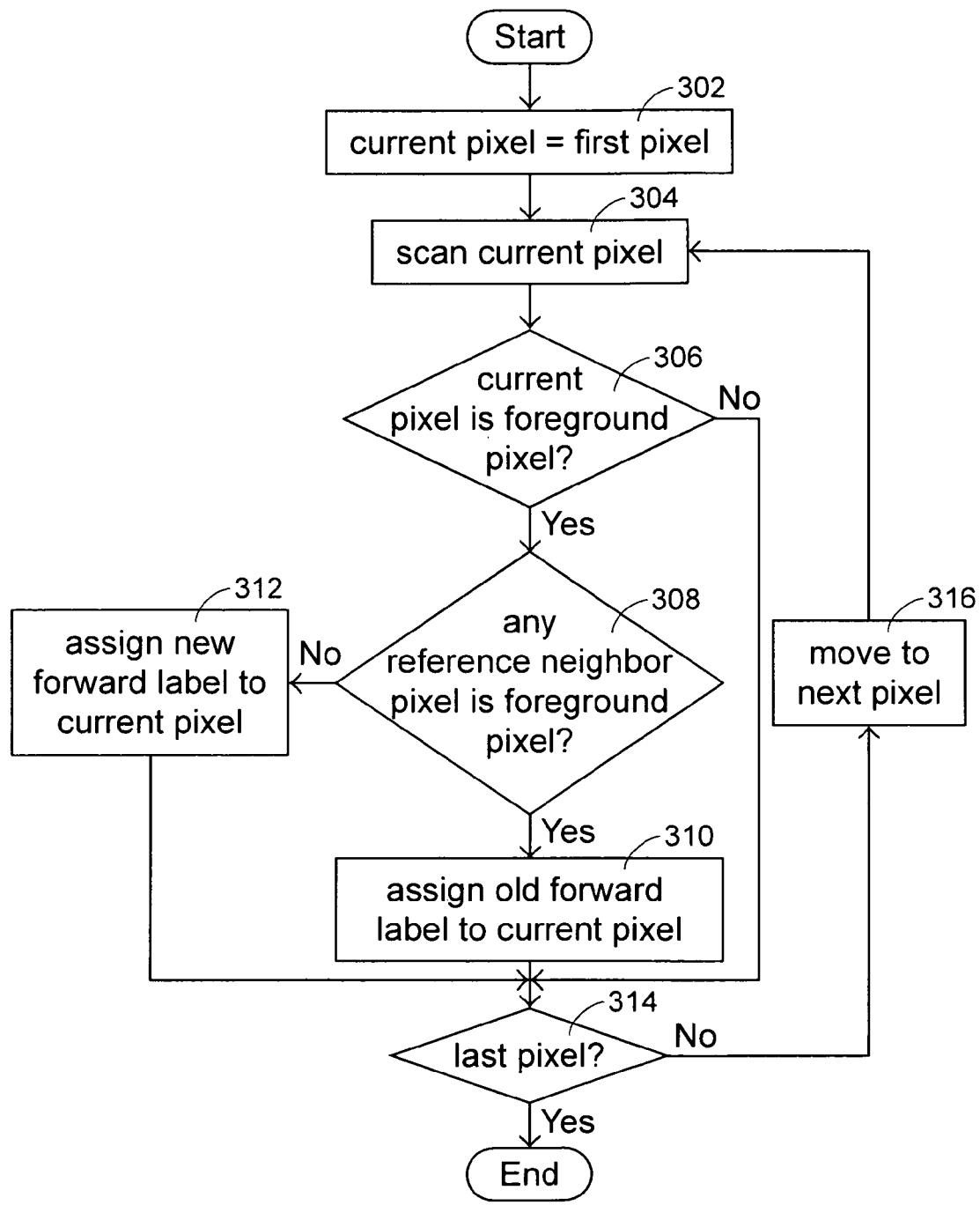
FIG. 3 illustrates sub-steps of the forward scan procedure in FIG. 2.

The hybrid connected component labeling algorithm according to the preferred embodiment includes the following steps: forward scan (step 206), backward scan (step 208), first rearrange label (step 210) and second rearrange label (step 212). These first three steps are described in detail with reference to FIGS. 3~5, respectively. FIG. 3 illustrates the sub-steps of the forward scan procedure. In the forward scan procedure, the binary mask is scanned from left to right and top to bottom. Hence, the reference neighbor pixels are defined to include four pixels, i.e. the top left one, the top one, the top right one and the left one adjacent to the current pixel. In step 302, the procedure starts from the first pixel. The current pixel is scanned in step 304 to determine, in step 306, whether the current pixel is a background pixel or a foreground pixel. If the current pixel is a foreground pixel, the procedure moves to step 308 to find out if any reference neighbor pixel is a foreground pixel and is already assigned a forward label. If yes, one of the forward label(s) of the reference neighbor pixel(s) is selected and assigned to the current pixel in step 310. One simple strategy for selecting the representative label is to use the smallest label. Nevertheless, other selection is applicable and available for different conditions. If none of the reference neighbor pixels is a foreground pixel, a new label separate from labels already assigned to other pixels is assigned to the current pixel in step 312. Afterwards, same steps repeat for the next pixel till the last pixel (steps 314 and 316). Also, if the current pixel is determined to be a background pixel in step 306, the forward scan procedure jumps to next pixel (steps 314 and 316).

Figure 4:
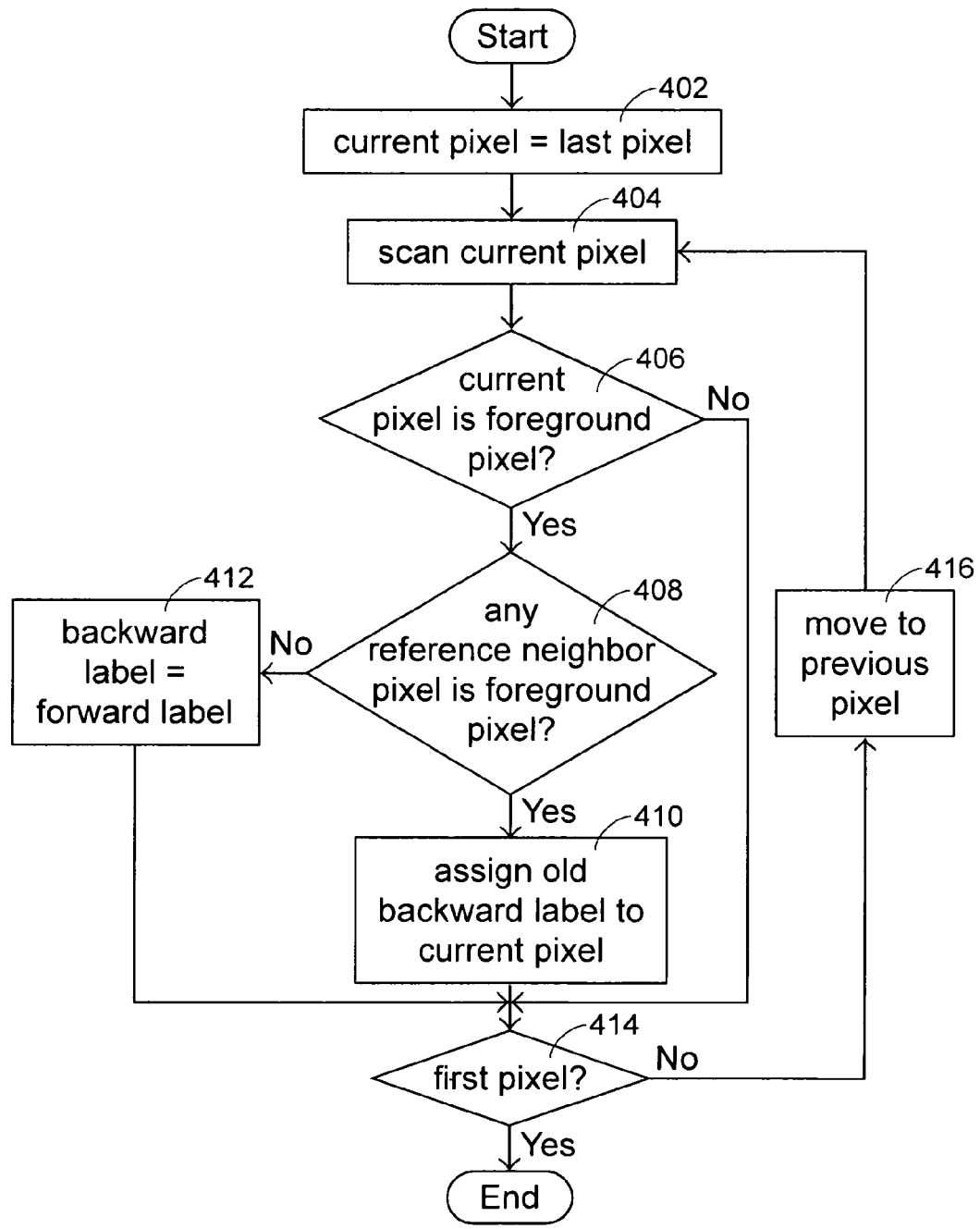
FIG. 4 illustrates sub-steps of the backward scan procedure in FIG. 2.

FIG. 4 illustrates the sub-steps of the backward scan procedure. In the backward scan procedure, the binary mask is scanned from right to left and bottom to top. Hence, the reference neighbor pixels are defined to include other four pixels, i.e. the bottom right one, the bottom one, the bottom left one and the right one adjacent to the current pixel. In step 402, the procedure starts from the last pixel. The current pixel is scanned in step 404 to determine, in step 406, whether the current pixel is a background pixel or a foreground pixel. If the current pixel is a foreground pixel, the procedure moves to step 408 to find out if any reference neighbor pixel is a foreground pixel. If yes, one label of backward label(s) of the reference neighbor pixel(s) and the forward label of the current pixel is selected and assigned to the current pixel in step 410. As described in the forward scan procedure, the most popular strategy for selecting the representative label is to use the smallest label. Nevertheless, other selection is applicable and available for different conditions. If none of the reference neighbor pixels is a foreground pixel, the current pixel holds the label assigned in the forward scan procedure in step 412. Afterwards, same steps repeat for the previous pixel till the whole binary mask is completely scanned (steps 414 and 416). Similarly, if the current pixel is determined to be a background pixel in step 406, the backward scan procedure jumps to previous pixel (steps 414 and 416).

Figure 5:
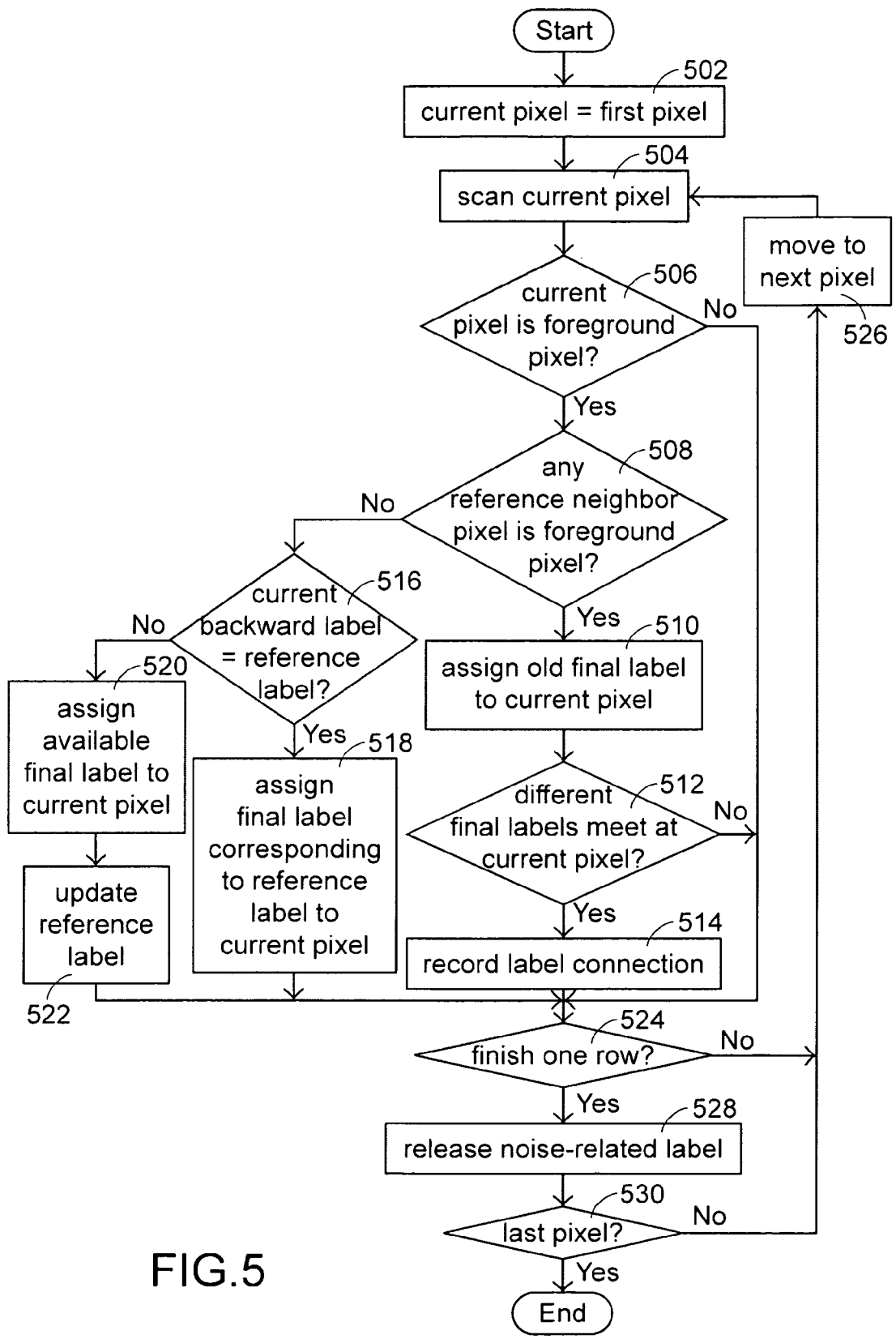
FIG. 5 illustrates sub-steps of the first label rearrange procedure in FIG. 2.

FIG. 5 illustrates the sub-steps of the first label rearrange procedure. In this procedure, the binary mask is scanned from left to right and top to bottom again. Hence, the reference neighbor pixels are defined to include four pixels, i.e. the top left one, the top one, the top right one and the left one adjacent to the current pixel, as described in the forward scan procedure. In step 502, the procedure starts from the first pixel. In step 504, the current pixel is scanned to determine, in step 506, whether the current pixel is a background pixel or a foreground pixel. If the current pixel is a foreground pixel, the procedure moves to step 508 to find out if any reference neighbor pixel is foreground pixel. If yes, one of the final labels of the reference neighborhood pixels is selected and assigned to the current pixel in step 510. In one embodiment, the smallest label is used. In step 512, the step determines whether different final labels meet at the current pixel, i.e. the current pixel has a different final label from the reference neighbor pixels. If yes, it means that the two adjacent labels belong to the same object and label connection recorded in the memory should be updated to memorize label equivalences (step 514).

On the contrary, if step 508 determines that none of the reference neighbor pixels is a foreground pixel, step 516 searches the backward label of the current pixel in reference labels in a label allocation table. If the current backward label matches one of the reference labels, a final label corresponding to the reference label is assigned to the current pixel to replace the backward label in step 518. Contrarily, if the current backward label is not found in the reference labels, the current backward label is filled in one reference label in step 522 and an available final label corresponding to the reference label is assigned to the current pixel in step 520.

When this path finishes one row (step 524), the procedure checks which object(s) is completely scanned so far based on the label connection. The area of each of these objects is obtained by calculating the number of pixels belonging to the same object, maybe with unique one or few labels. If the area of the current object is determined to be smaller than a predetermined threshold area, the object is considered as noise, but not a real object. Hence, the noise-related label(s) is released and available for other objects in step 528. The same steps and determinations repeat for the next pixel till the last pixel (steps 526 and 530).

Figure 6A:
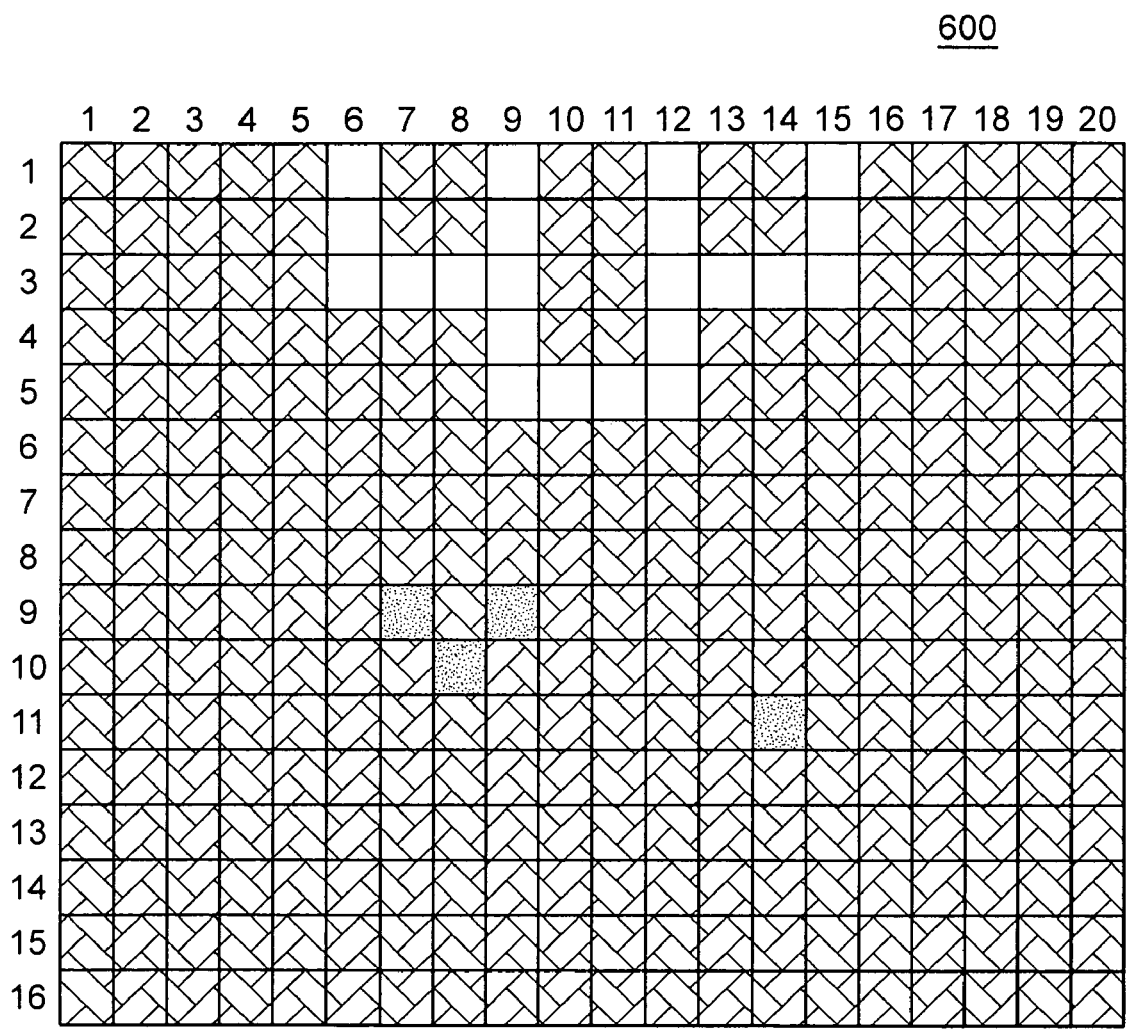

After the first label rearrange procedure, a second label rearrange procedure is executed to adjust some labels to allow pixels belonging to the same object to be assigned with a unique label. This rearrange procedure is executed according to the label connection established in the first label rearrange procedure, For further description, a simple image is taken as an example. FIGS. 6A~6I schematically illustrates how the hybrid connected component labeling algorithm according to the present invention operates. FIG. 6A shows a binary mask 600 obtained by comparing the current image frame and the background model. The binary mask 600 has 20×16 pixels, which will be mentioned in coordinates (M, N) hereinafter. There are twenty-two empty squares and four shaded squares. The empty squares include pixels (6, 1), (9, 1), (12, 1), (15, 1), (6, 2), (9, 2), (12, 2), (15, 2), (6, 3), (7, 3), (8, 3), (9, 3), (12, 3), (13, 3), (14, 3), (15, 3), (9, 4), (12, 4), (9, 5), (10, 5), (11, 5) and (12, 5) denoting object pixels, and the shaded squares include pixels (7, 9), (9, 9), (8, 10) and (14, 11) denoting noise. These total twenty-six pixels are viewed as foreground pixels in the forward scan procedure 206 and backward scan procedure 208.

FIG. 6B shows the labeling after the forward scan procedure. The labeling of pixels is in a sequence as listed in the foregoing paragraph. Pixel (6, 1) is the first detected foreground pixel, and there is only one reference neighbor pixel—pixel (5, 1). Since pixel (5, 1) is a background pixel, a new forward label 0 is assigned to current pixel (6, 1). For another instance, when the forward scan procedure moves to pixel (9, 3), four reference neighbor pixels are pixels (8, 2), (9, 2), (10, 2) and (8, 3) wherein pixel (9, 2) and pixel (8, 3) receive forward label 1 and 0, respectively, and the other two pixels are background pixels. Hence, the smallest forward label 0 is selected and assigned to the current pixel (9, 3). After the forward scan procedure, the twenty-six squares are labeled as shown in FIG. 6B.

Figure 6C:
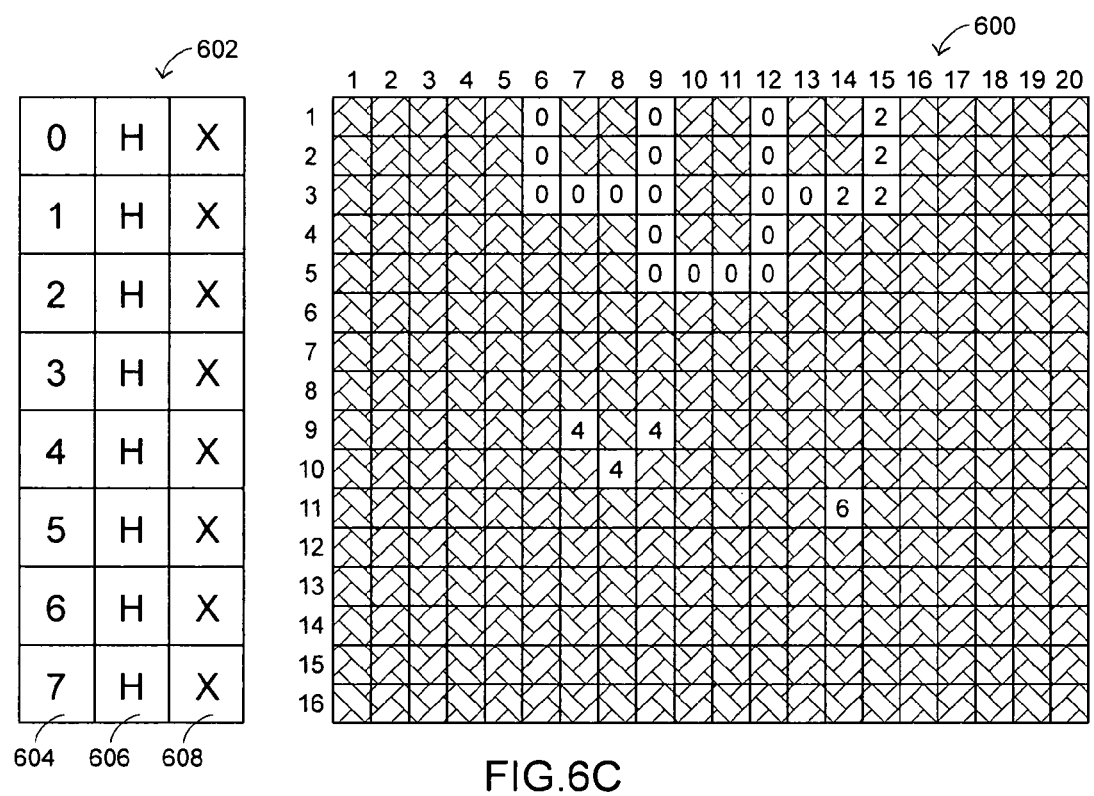
Figure 6D:
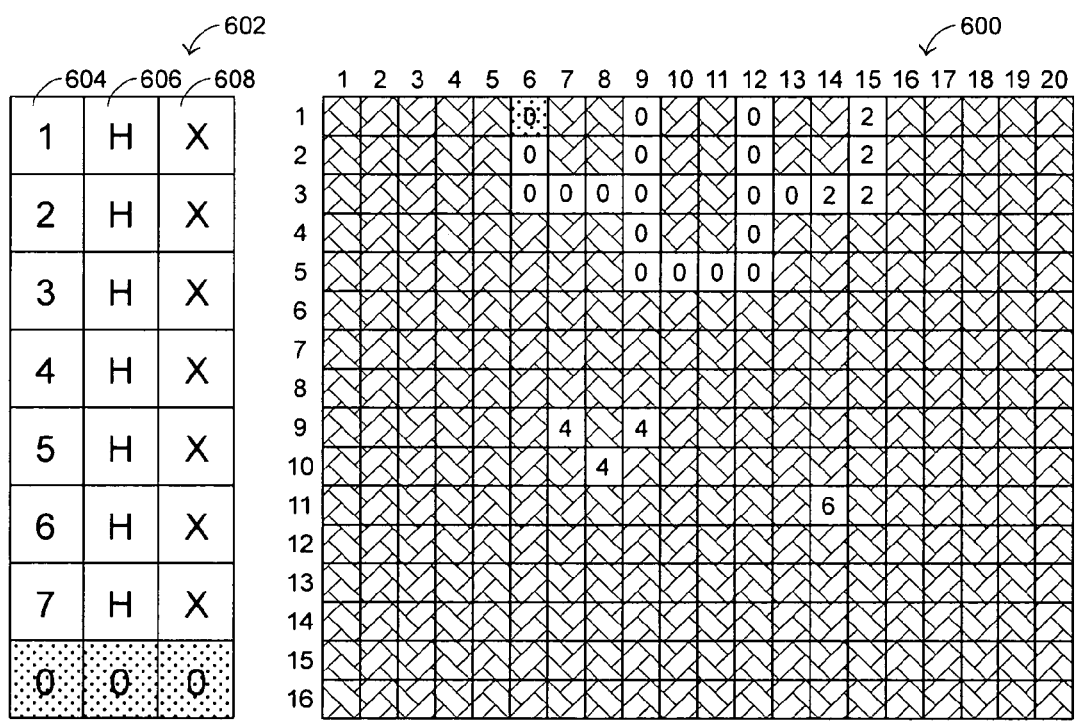

FIG. 6C shows the labeling after the backward scan procedure. The labeling of pixels is in a reverse sequence to the forward scan procedure. Pixel (14, 11) is the first detected foreground pixel, and the reference neighbor pixels are pixels (15, 12), (14, 12), (13, 12) and (15, 11). Since none of these four pixels is a foreground pixel, the current pixel (14, 11) holds original forward label 6 as its backward label. For another instance, when the backward scan procedure moves to pixel (9, 9), four reference neighbor pixels are pixel (10, 10), (9, 10), (8, 10) and (10, 9) wherein pixel (8, 10) receives backward label 4 and the other three pixels are background pixels. Considering the forward label of the current pixel (9, 9) is label 5, the smallest label 4 is selected as the backward label for to the current pixel (9, 9). After the backward scan procedure, the twenty-six squares are labeled as shown in FIG. 6C.

An initial label allocation table 602 is also shown in FIG. 6C. The label allocation table includes three columns: a set of final labels 604, a set of valid row values 606 and a set of reference labels 608. The final labels indicate the labels to be used in the first label rearrange procedure. The valid row values indicate that the corresponding final labels don't appear in the range from the first row to the indicated row. If the final label is assigned to a pixel located in the first row, the valid row value is read as "0". As for the reference labels, a reference label marked with "X" indicates the corresponding final label is available. Otherwise, if a reference label is occupied by an integer number, the current pixel having a backward label matching the integer number should be newly assigned with the corresponding final label.

FIGS. 6D~6G schematically illustrates the binary mask and the use of the label allocation table during the first label rearrange procedure. Please also refer back to FIG. 5 for further description. The binary mask 600 is scanned in a forward direction again to assign a final label to all foreground pixels. Pixel (6, 1) is the first detected foreground pixel, and there is only one reference neighbor pixel—pixel (5, 1). Since pixel (5, 1) is a background pixel (step 508), the procedure searches for the current backward label 0 in the reference label set 608 (step 516), but fails. Therefore, an available final label 0 is selected and assigned to current pixel (6, 1). At the same time, the corresponding valid row value and reference label are filled with "0" to indicate that label 0 only appears after the zeroth row and that each backward label 0 of the later-scanned pixels will be substituted with final label 0.

Figure 6E:
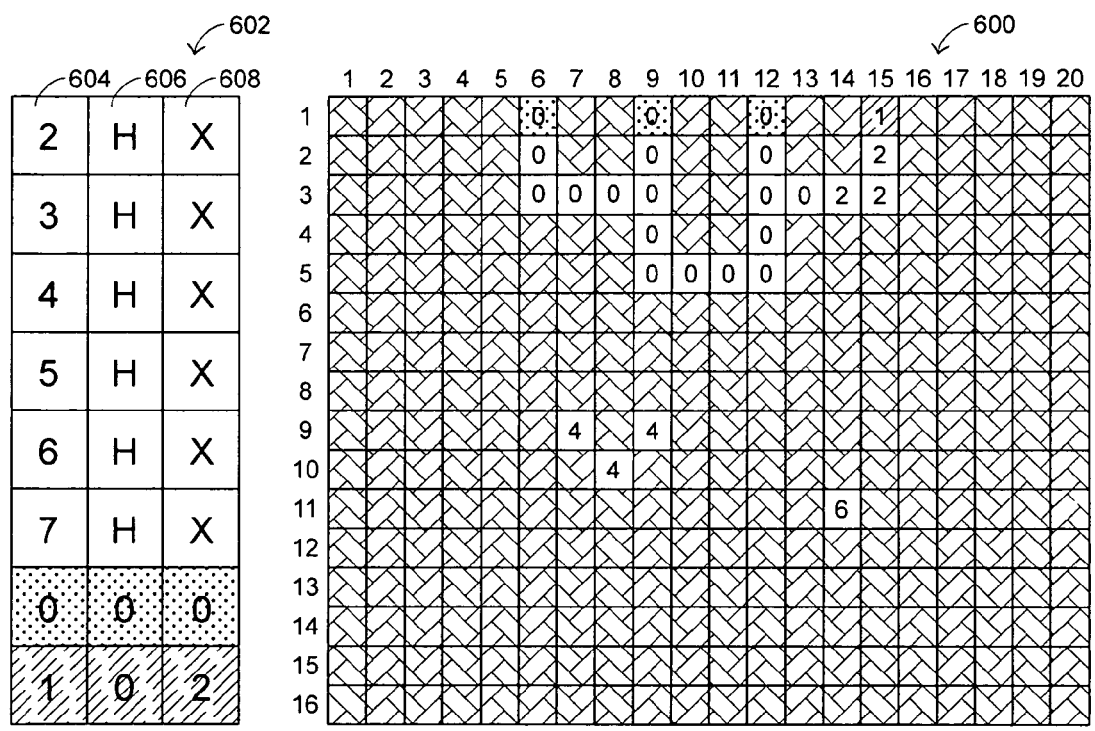

Referring to FIG. 6E, when the first label rearrange procedure goes to pixel (9, 1), there is only one reference neighbor pixel, that is, pixel (8, 1), a background pixel (step 508). The procedure finds that the current background label 0 matches the reference label 0 (step 516) so as to assign the corresponding final label 0 to current pixel (9, 1) (step 518). For another instance, when the first label rearrange procedure goes to pixel (15, 1), there is only one reference neighbor pixel, that is, pixel (14, 1), a background pixel (step 508). The procedure searches for the current label 2 in the reference label set 608 (step 516), but fails. Therefore, an available final label 1 is selected and assigned to current pixel (15, 1). At the same time, the corresponding valid row value and reference label are respectively filled with "0" and "2" to indicate that label 1 only appears after the zeroth row and that each backward label 2 will be substituted with final label 1.

Figure 6F:
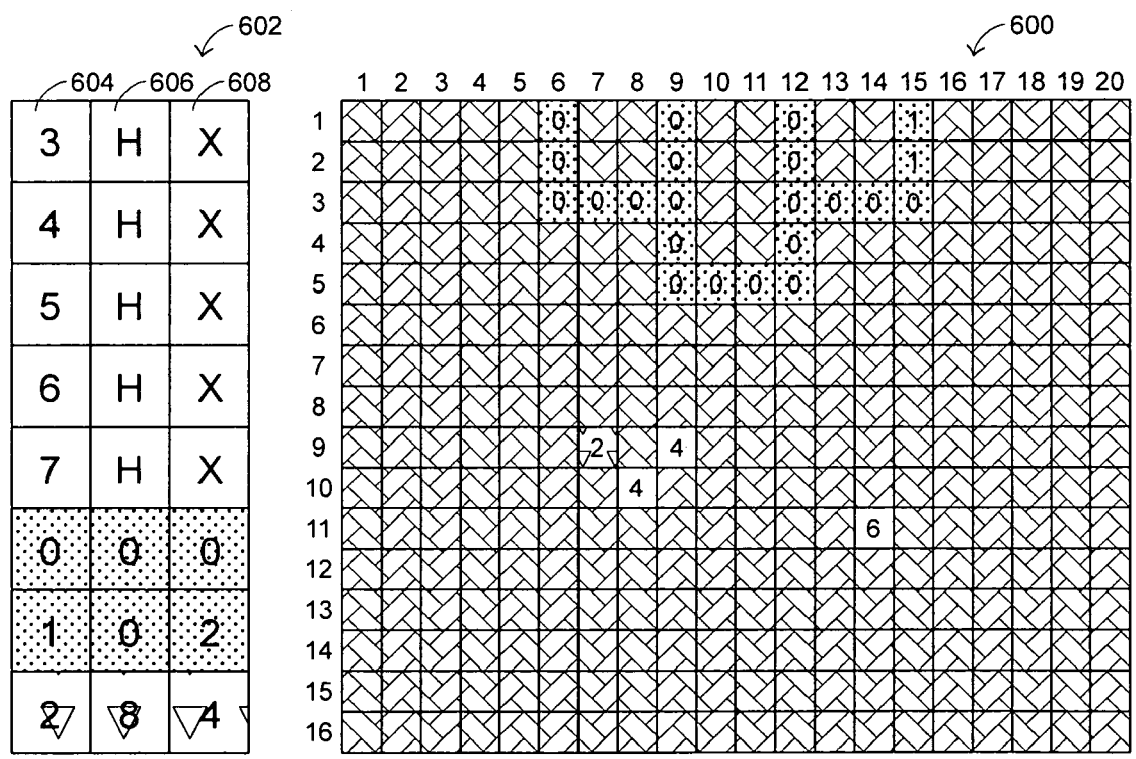

Please note that pixel (14, 3) has final label 0, being different from final label 1 of reference neighbor pixel (15, 2) in FIG. 6F. In other words, different labels meet at pixel (14, 3) (step 512). Label connection is updated to indicate that pixels assigned with final label 0 and pixels assigned with final label 1 belong to the same object (step 514). Referring to FIG. 6F, the first label rearrange procedure goes through the first six rows of the binary mask 600. At the end of the sixth row, i.e. pixel (20, 6), it is found that the sixth row does not include any pixel belonging to the object corresponding to final label 0 and label 1. That is, the scan of this object is finished and the area thereof can be calculated and obtained. Since the area is determined not smaller than a predetermined threshold area, this object is considered as not noise and remained.

Figure 6G:
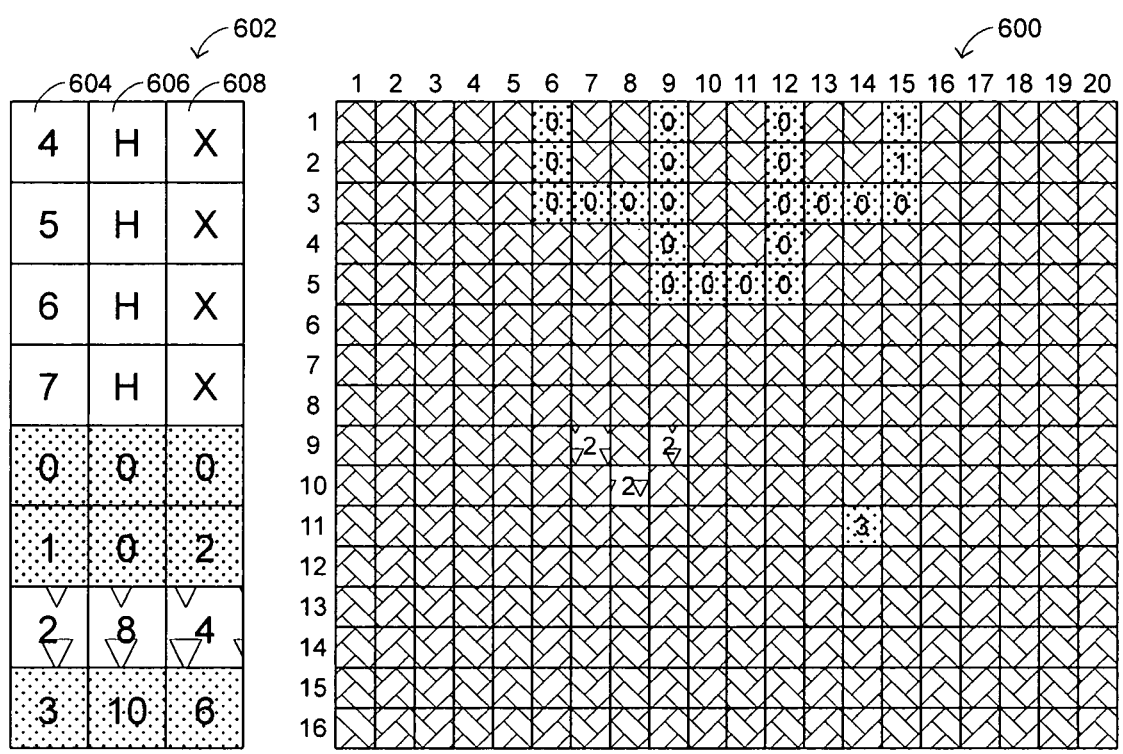

According to the above description and examples, pixels (7, 9), (9, 9) and (8, 10) are assigned with final label 2 and pixel (14, 11) is assigned with final label 3. In the label allocation table 602, final label 2 and 3 correspond to reference label 4 and 6, respectively. The resulting binary mask 600 and label allocation table 602 are shown in FIG. 6G.

Figure 6H:
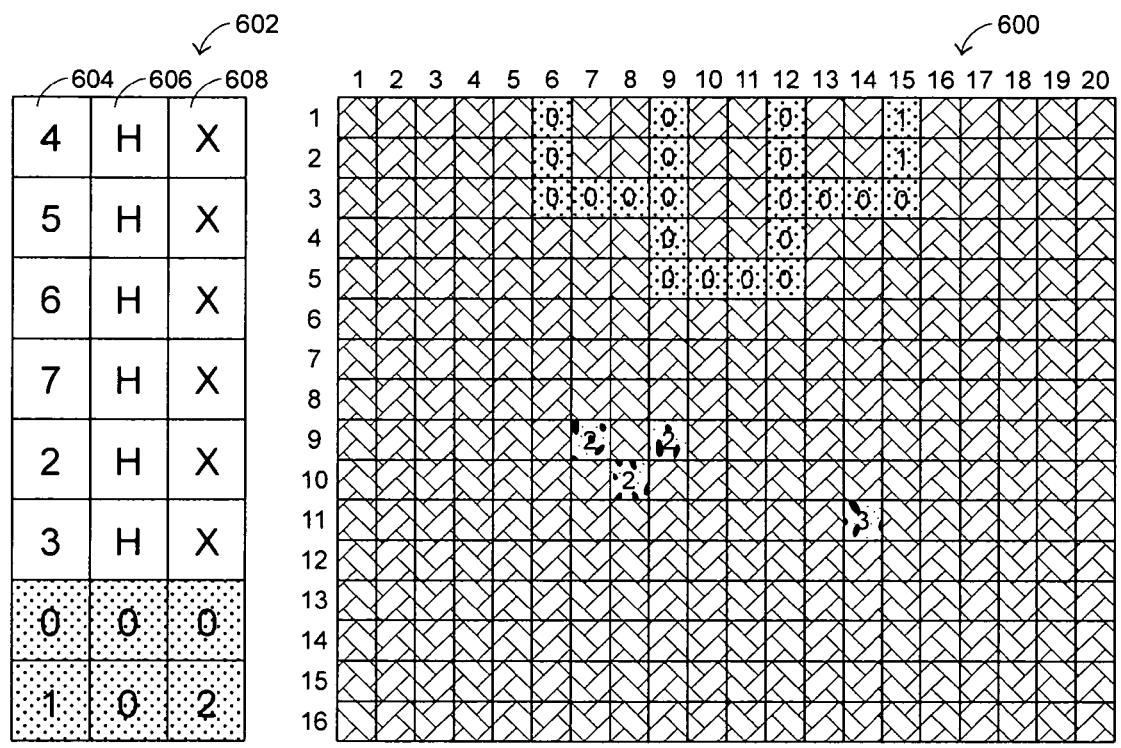

The objects corresponding to final label 2 and 3 are determined as noise at the ends of the eleventh and the twelfth rows, respectively. The step of releasing noise-related label calculates area of each object which is just scanned completely in the first label rearrange procedure wherein one object may include pixels with one label or few labels based on the label connection recorded in the label rearrange procedure. If the area of one object is determined to be smaller than a predetermined threshold area, the pixels of this object are considered as noise, instead of foreground pixels. The label allocation table 602 is updated to release the noise-related labels. For example, pixels with final label 2 and 3 are considered as noise, the related reference labels are marked with "X" again so that these two final labels are available for other objects, as shown in FIG. 6H. Please note that it is not necessary to return the related reference labels to their initial values, i.e. "X". Other values are suitable to indicate that the final labels are ever used but available now. This step may significantly reduce the total number of used labels during the first label rearrange procedure to avoid depletion of limited labels provided by the hardware.

Figure 6I:
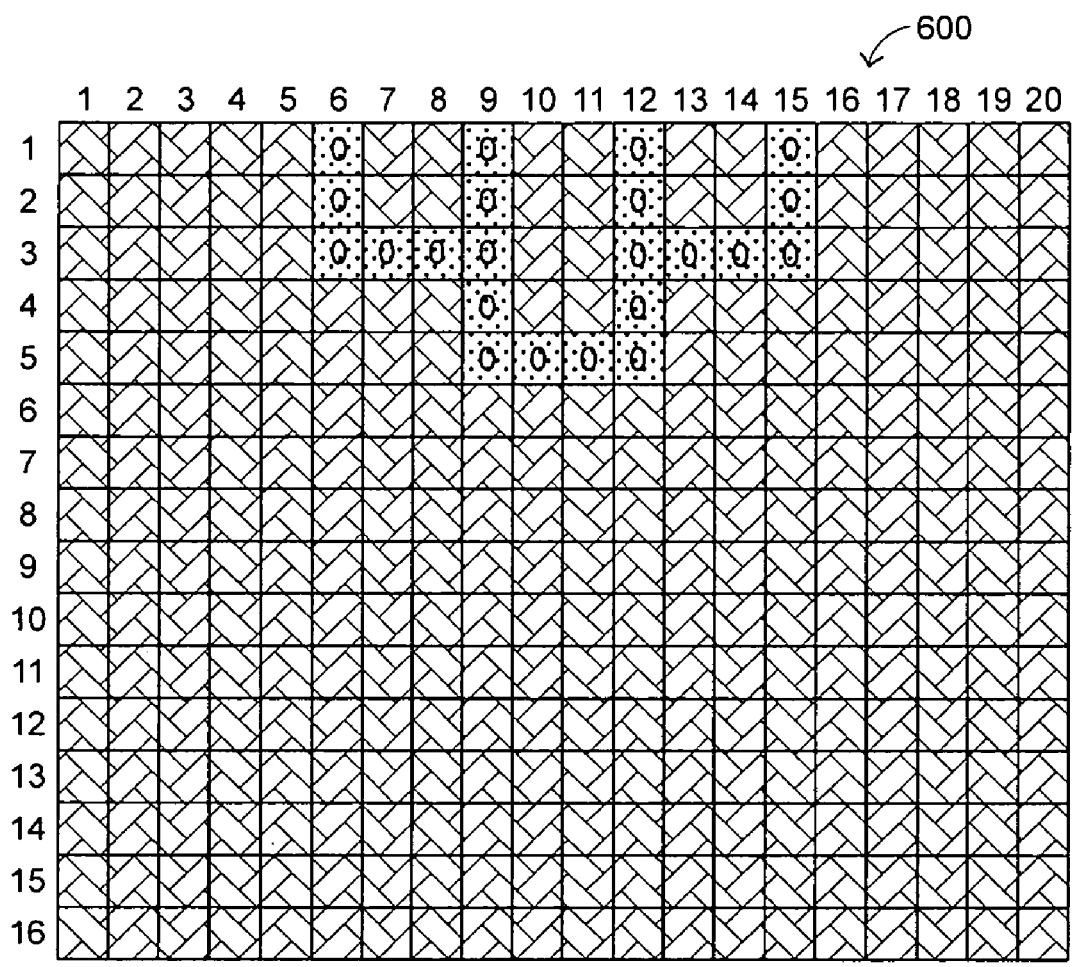

FIG. 6I illustrates the resulting binary mask 600 after the second label rearrange procedure. In this procedure, the labels are adjusted to allow pixels belonging to the same object are assigned with a unique label. For example, according to the label connection recorded in the first label rearrange procedure, pixels assigned with final label 0 and pixels assigned with final label 1 belong to the same object. Hence, the labels of pixel (15, 1) and (15, 2) are changed into label 0.

Figure 7A:
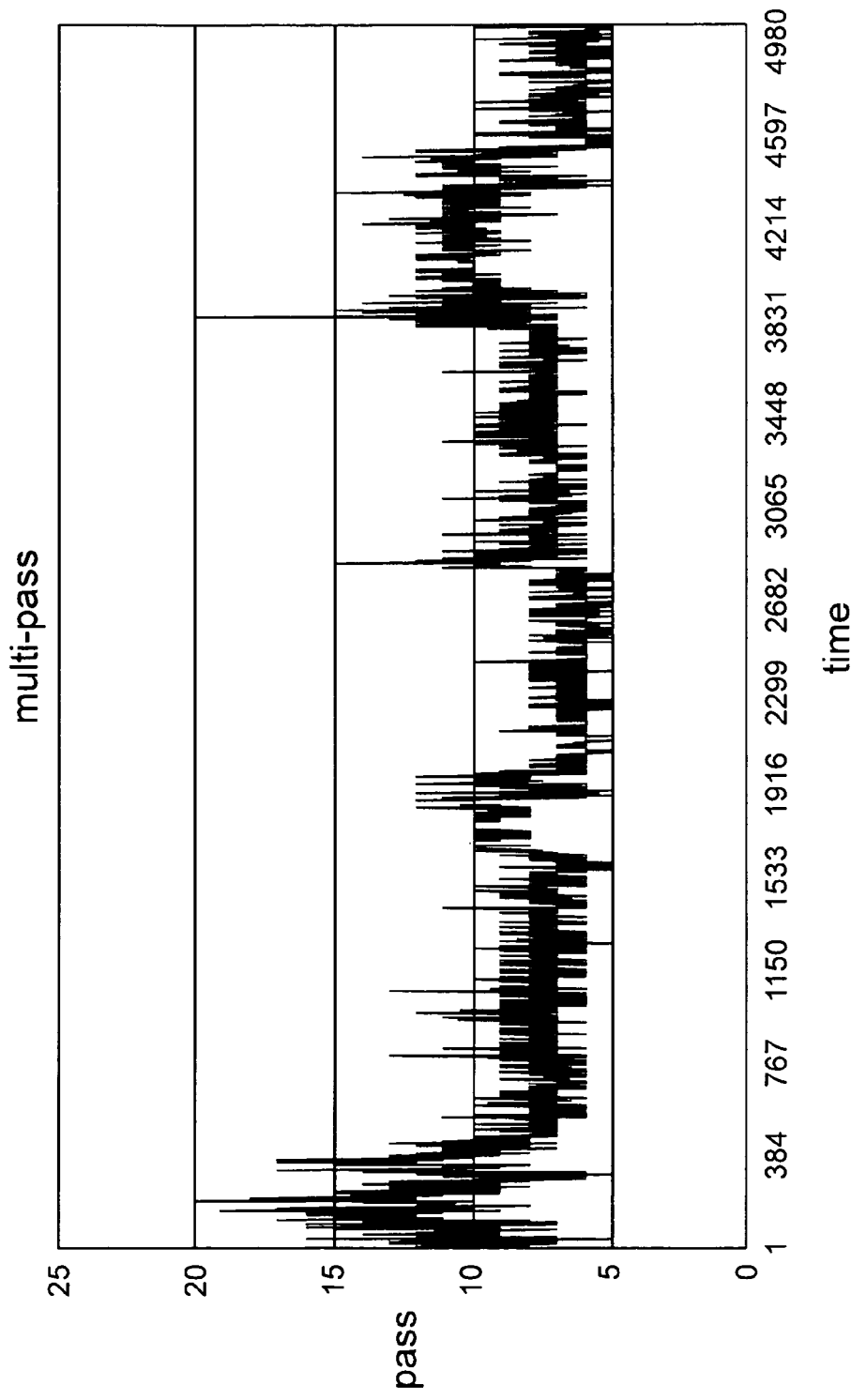
FIGS. 7A and 7B schematically illustrate an analysis result of a test video clip according to a prior art multi-pass algorithm.
Figure 7B:
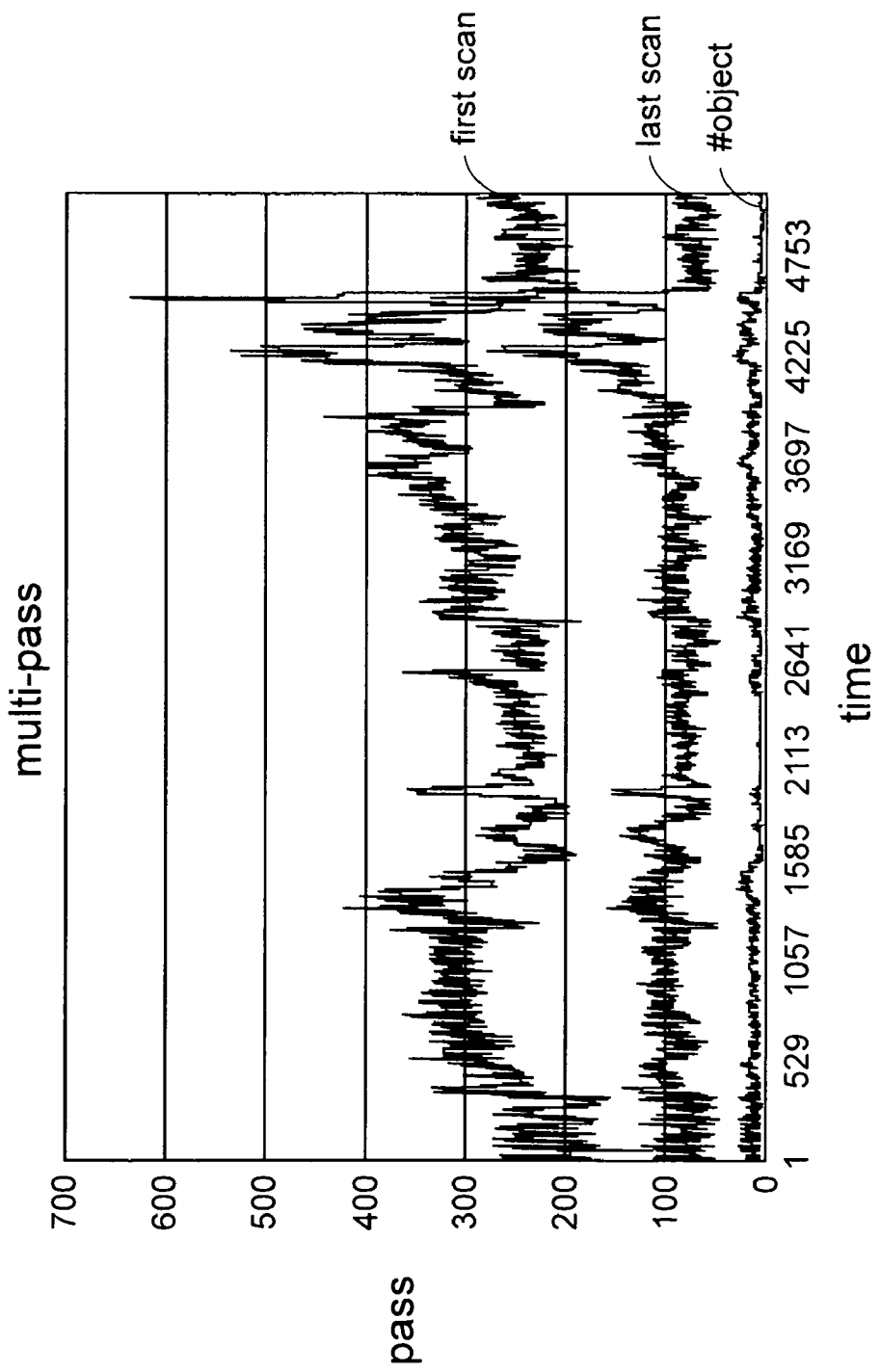

To show the efficiency of the present hybrid connected component labeling algorithm, a video clip (AVSS 2006 Abandoned Baggage Easy Case, 720×576 pixels, 5053 frames) is analyzed by means of multi-pass algorithm, two-pass algorithm and the present hybrid algorithm, respectively. FIGS. 7A and 7B illustrate the analysis result of multi-pass algorithm. A maximum of twenty passes is required according to multi-pass algorithm. A maximum of 638 labels is used during the first scan and a maximum of 337 labels is used during the last scan without releasing the noise-related labels. The memory for labels reaches 801 bytes.

Figure 8:
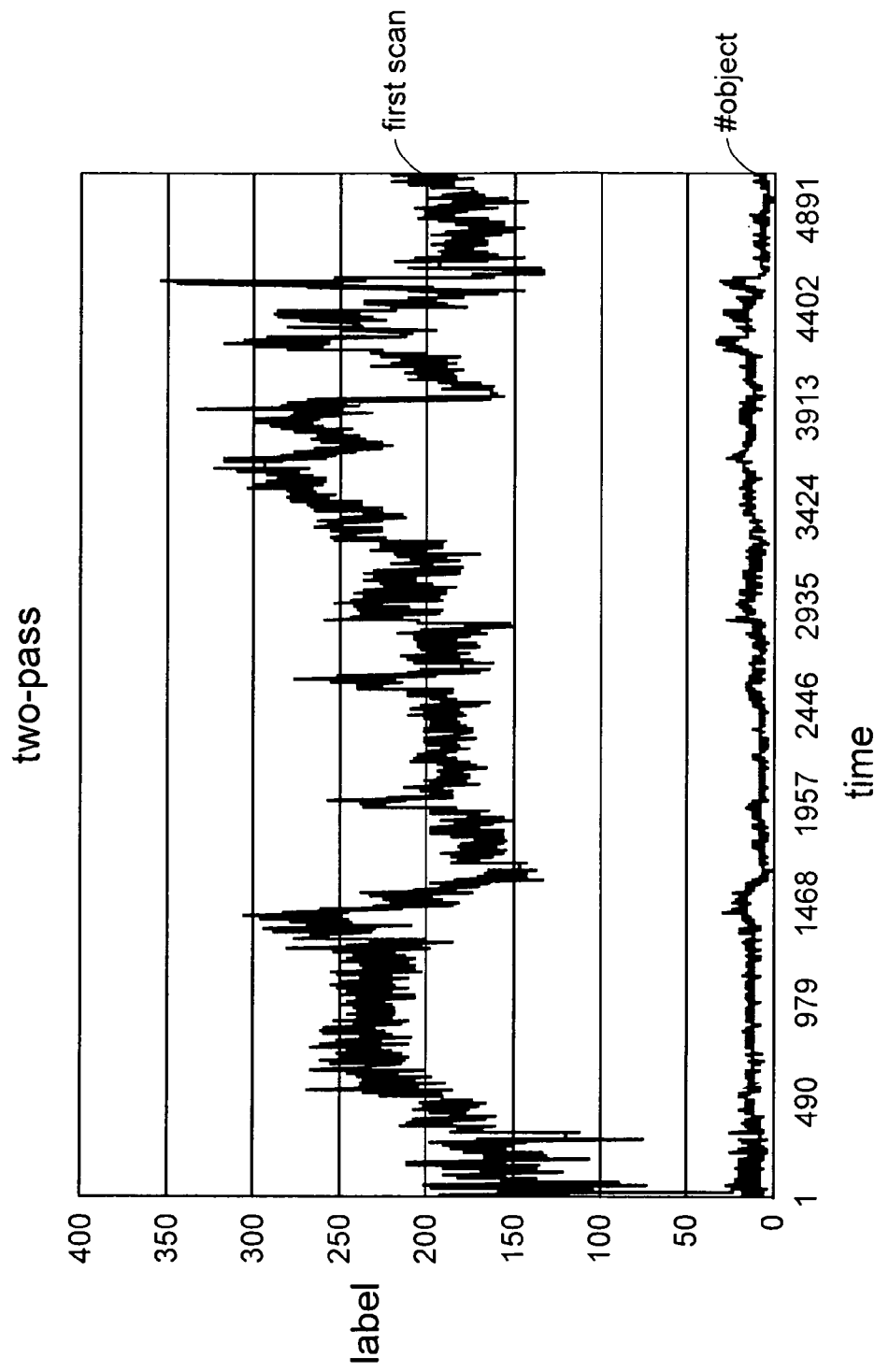
FIG. 8 schematically illustrates an analysis result of the test video clip according to a prior art two-pass algorithm.

FIG. 8 illustrates the analysis result of two-pass algorithm. Only two passes are required according to two-pass algorithm. A maximum of 354 labels is used during the first scan wherein the noise-related labels are released so that the number of the labels required is less than that during the first scan of the multi-pass algorithm. The memory for labels, including label connection table, reaches 2,080 bytes.

Figure 9:
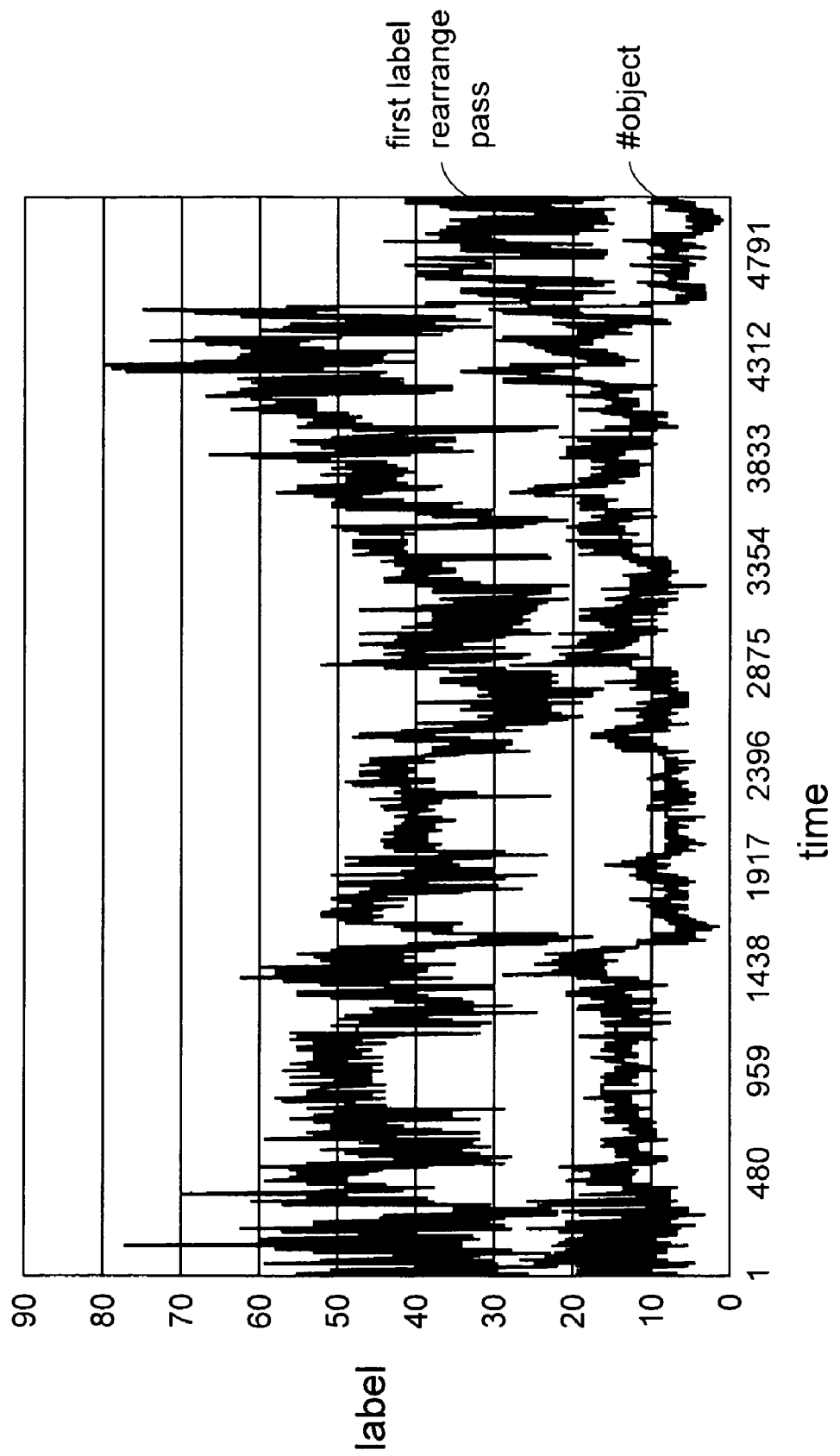
FIG. 9 schematically illustrates an analysis result of the test video clip according to the hybrid connected component labeling algorithm of the present invention.

FIG. 9 illustrates the analysis result of the hybrid connected component labeling algorithm according to the present invention. Four passes are required. A maximum of 638 labels is used during the first scan, the same as multi-pass algorithm. The first label rearrange pass requires a maximum of 80 labels, much fewer than multi-pass algorithm and two-pass algorithm. During this procedure, the total number of the required labels is close to the real number of objects. Besides, the usage amount of the memory for labels is only 570 bytes, the smallest one among the three algorithms.

Figure 10:
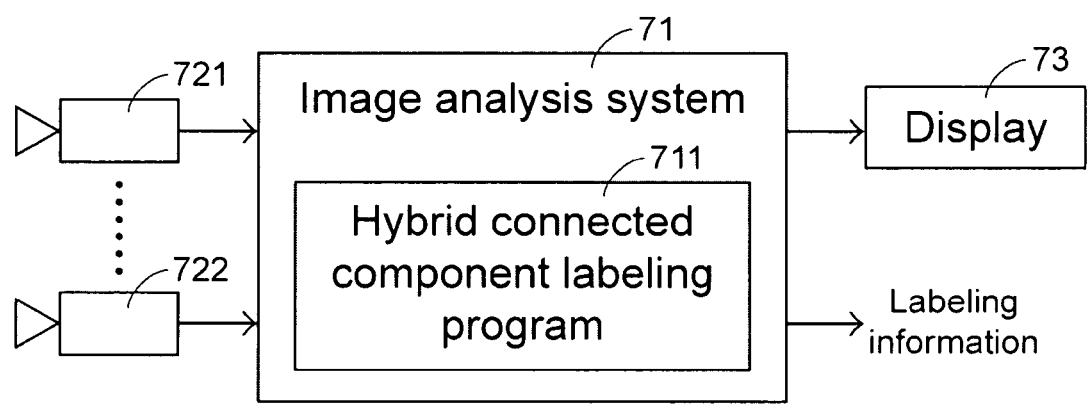
FIG. 10 schematically illustrates an image analysis system using the hybrid connected component labeling algorithm according to the present invention.

FIG. 10 schematically illustrates an image analysis system using the hybrid connected component labeling algorithm according to the present invention. The image analysis system 71 can be an image processor or a computer system. The hybrid connected component labeling program 711 is stored in the image analysis system 71 to perform the image analysis after the (video) image frames are captured by the video camera 721 . . . 722. Only two video cameras are shown in this figure but the number varies according to the practical applications. The analysis result including the labeling information can be shown on a display 73 or outputted to and processed by other device. In other embodiment, the hybrid connected component labeling process is implemented with a hardware approach. Hence, the image analysis system includes a forward scan block, a backward scan block and a label rearrange block to perform the corresponding procedures as described above. The blocks can work separately or integrally to present their functionalities.

From the above description, the hybrid connected component labeling algorithm of the present invention combines the advantages of multi-pass algorithm and two-pass algorithm. That is, the hybrid connected component labeling algorithm requires fixed passes, i.e. four passes, fewer than multi-pass algorithm, but can significantly reduce the use of labels. Because of low need of hardware resource, the present algorithm and image analysis method can be easily implemented by common hardware or processor to reduce cost incurred by complex system.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hybrid connected component labeling process for analyzing an image comprising a plurality of pixels having at least one foreground pixel, comprising steps of:
   executing a forward scan procedure comprising steps of:
      scanning the plurality of pixels in a first direction; and
      assigning a forward label to the scanned pixel according to another forward label of at least one pixel adjacent to the scanned pixel when the scanned pixel is the foreground pixel;
   executing a backward scan procedure comprising steps of:
      scanning the plurality of pixels in a second direction opposite to the first direction; and
      assigning a backward label to the scanned pixel according to another backward label of at least one pixel adjacent to the scanned pixel and the forward label of the scanned pixel when the scanned pixel is the foreground pixel; and
   executing a first label rearrange procedure comprising steps of:
      providing a label allocation table including a plurality of final labels and a plurality of reference labels;
      scanning the plurality of pixels in the first direction;
      assigning one of the plurality of final labels to the scanned pixel according to the backward label of the scanned pixel and the reference labels;
      recording label connection of labels; and
      updating the reference label in the label allocation table according to the label connection to release the final label corresponding to the reference label, wherein in the first label rearrange procedure, the one final label is an unused final label when none of the adjacent pixel is the foreground pixel and the backward label doesn't match any one of the plurality of reference labels.

2. The hybrid connected component labeling process according to claim 1, further comprising a step of executing a second label rearrange procedure comprising steps of:
   changing the final label according to the label connection to have the pixels belonging to the same object be assigned with a unique final label.

3. The hybrid connected component labeling process according to claim 1 wherein the label connection is recorded when the final label of the scanned pixel is different from another final label of at least one pixel adjacent to the scanned pixel.

4. The hybrid connected component labeling process according to claim 1 wherein the image is a binary mask.

5. The hybrid connected component labeling process according to claim 4 wherein the binary mask is obtained by background subtraction of a background model from a frame.

6. The hybrid connected component labeling process according to claim 1 wherein the plurality of pixels are arranged in M columns and N rows.

7. The hybrid connected component labeling process according to claim 6 wherein the pixels adjacent to the scanned pixel (M, N) in the forward scan procedure includes a pixel (M−1, N−1), a pixel (M, N−1), a pixel (M+1, N−1) and a pixel (M−1, N).

8. The hybrid connected component labeling process according to claim 6 wherein the pixels adjacent to the scanned pixel (M, N) in the backward scan procedure includes a pixel (M+1, N), a pixel (M−1, N+1), a pixel (M, N+1) and a pixel (M+1, N+1).

9. The hybrid connected component labeling process according to claim 1 wherein in the forward scan procedure, the forward label is the smallest label selected from the forward label of the at least one pixel adjacent to the scanned pixel when the at least one adjacent pixel is the foreground pixel.

10. The hybrid connected component labeling process according to claim 1 wherein in the forward scan procedure, the forward label is an unused forward label when none of the adjacent pixel is the foreground pixel.

11. The hybrid connected component labeling process according to claim 1 wherein in the backward scan procedure, the backward label is the smallest label selected from the backward label of the at least one pixel adjacent to the scanned pixel and the forward label of the scanned pixel when the at least one adjacent pixel is the foreground pixel.

12. The hybrid connected component labeling process according to claim 1 wherein in the backward scan procedure, the backward label is the forward label of the scanned pixel when none of the adjacent pixel is the foreground pixel.

13. The hybrid connected component labeling process according to claim 1 wherein the first label rearrange procedure further comprises a step of changing a reference label corresponding to the unused final label into the backward label.

14. The hybrid connected component labeling process according to claim 1 wherein in the first label rearrange procedure, the one final label corresponds to one of the reference label when none of the adjacent pixel is the foreground pixel and the one reference label matches the backward label.

15. The hybrid connected component labeling process according to claim 1 wherein in the first label rearrange procedure, the one final label is the smallest label selected from the final label of the at least one pixel adjacent to the scanned pixel when the at least one adjacent pixel is the foreground pixel.

16. The hybrid connected component labeling process according to claim 1 wherein the first label rearrange procedure further comprises steps of:
   calculating an area of an object consisting of pixels with at least one final label according to the label connection; and
   returning the reference label corresponding to the final label to an initial state when the area is smaller than a predetermined threshold area.

17. The hybrid connected component labeling process according to claim 16 wherein the final label is released after an object corresponding to the final label is completely scanned during the first label rearrange procedure.

18. A method for analyzing an image frame using the hybrid connected component labeling process according to claim 1, comprising steps of:
   establishing a background model;
   subtracting the background model from the image frame to obtain a binary mask comprising a plurality of pixels having at least one foreground pixel; and
   executing the forward scan procedure, the backward scan procedure and the first label rearrange procedure for the binary mask.

19. A method for analyzing an image frame comprising a plurality of pixels having at least one foreground pixel, comprising steps of:
   establishing a background model;
   subtracting the background model from the image frame to obtain a binary mask comprising a plurality of pixels having at least one foreground pixel; and
   executing a hybrid connected component labeling process, comprising steps of:
      executing a forward scan procedure, comprising steps of:
         scanning the plurality of pixels in a first direction; and
         assigning a forward label to the scanned pixel according to another forward label of at least one pixel adjacent to the scanned pixel when the scanned pixel is the foreground pixel;
      executing a backward scan procedure, comprising steps of:
         scanning the plurality of pixels in a second direction opposite to the first direction; and
         assigning a backward label to the scanned pixel according to another backward label of at least one pixel adjacent to the scanned pixel and the forward label of the scanned pixel when the scanned pixel is the foreground pixel; and
      executing a first label rearrange procedure, comprising steps of:
         providing a label allocation table including a plurality of final labels and a plurality of reference labels;
         scanning the plurality of pixels in the first direction;
         assigning one of the plurality of final labels to the scanned pixel according to the backward label of the scanned pixel and the reference labels;
         recording label connection of labels; and
         updating the reference label in the label allocation table according to the label connection to release the final label corresponding to the reference label,
         wherein in the first label rearrange procedure, the one final label is an unused final label when none of the adjacent pixel is the foreground pixel and the backward label doesn't match any one of the plurality of reference labels.

* * * * *